March 23, 1954 M. P. LAURENT Re. 23,805

CLOSURE JOINT

Original Filed July 6, 1943 3 Sheets-Sheet 1

Milton P. Laurent.
INVENTOR.

BY

ATTORNEY

March 23, 1954 M. P. LAURENT Re. 23,805

CLOSURE JOINT

Original Filed July 6, 1943 3 Sheets-Sheet 2

Milton P. Laurent.
INVENTOR.

BY Alex. Stenn

ATTORNEY.

March 23, 1954 M. P. LAURENT Re. 23,805

CLOSURE JOINT

Original Filed July 6, 1943 3 Sheets-Sheet 3

Milton P. Laurent
INVENTOR.

BY Geo. B. Stenn.

ATTORNEY

Reissued Mar. 23, 1954

Re. 23,805

UNITED STATES PATENT OFFICE 23,805

CLOSURE JOINTS

Milton P. Laurent, Houston, Tex.

Original No. 2,582,995, dated January 22, 1952, Serial No. 493,673, July 6, 1943. Application for reissue December 21, 1953, Serial No. 399,647

19 Claims. (Cl. 220—25)

Matter enclosed in heavy brackets [ ] appears in the original patent but forms no part of this reissue specification; matter printed in italics indicates the additions made by reissue.

This invention relates to a plug and joint structure and has for its general object the provision of an improved plug and joint arrangement for sealing pressure vessels.

In the past, openings such as hand holes and man holes and clean out openings and the like in pressure vessels and pipe lines as well as openings in return bends and other special fittings subjected to internal pressure, have been sealed generally in one of three ways. The first of these is to provide a tapered edge about the opening so as to form a seat which tapers inwardly toward the interior of the vessel. A similarly tapered plug is then seated upon this seat and is secured in place by means of clamping devices or other super structure secured to the vessel about the outside of the opening. Such a structure is necessarily very heavy where the pressures are substantial. It presents substantial difficulties also in casting or otherwise forming the super structure for holding the plugs in place, and it is subject to the serious objection that under high temperatures and pressures the plug will be forced outwardly and thus loosened from its seat, thereby producing leakage.

The second type of structure heretofore used is that in which the opening is made of an oval outline and the closure member is made of similar form but slightly larger than the opening so that the closure member can be put in through the opening. Some sort of soft gasket material is then inserted between the closure member and the inside edge of the opening and the closure member is drawn tight against the gasket by suitable securing means provided for that purpose. This structure likewise has numerous objections, principal among which are that it is not easily machined because of the necessity for making both the opening and the cover of oval outline, and it will not hold up under high pressures and temperatures because it is impossible to machine it so that it will fit securely with a metal-to-metal contact and it is therefore necessary to provide a soft sealing material to form a seat. Such a structure is therefore expensive to make and will not stand up under high temperatures and pressures.

The third type of structure is that in which a flanged member is secured about the opening by means of welding or otherwise, and the closure member is bolted to this flanged member with suitable means therebetween for the purpose of effecting a seal. Such a structure as this is so extremely heavy for high pressures and temperatures that its use especially under the present day shortage of critical materials is almost prohibitive. It is significant in connection with the first two types described that, although this third type is the most expensive and most difficult to make and break of the three types, it is the one most commonly used, especially for high pressures and temperatures. This is because the first two types are so relatively inefficient and are much more limited in their application than the third type.

In addition to the foregoing, it has in the past been proposed to provide openings such as those referred to with their edges tapered outwardly toward the outside of the vessel instead of inwardly toward the inside thereof, to provide a plug similarly tapered but of circular formation and of a sufficiently small maximum diameter so that it may pass through the opening referred to, and then to insert between the outer edge of the plug and the inner edge of the opening a ring of soft pliable metal to hold the plug against being pushed out through the opening. Such ring of pliable metal when pressure is placed on the plug will serve to spread and flow and thereby produce a seal between the plug and the opening. Such a structure as just referred to, however, cannot be used for high pressures and temperatures because under high temperatures the sealing ring just referred to will either become greatly weakened or will actually melt, whereupon the plug will be forced out through the opening. Such materials are usually so soft that if the pressure is of substantial value the material may be caused to flow under pressure alone so that the plug may be forced out through the opening. Furthermore, such structures have customarily been made with the tapered openings and plugs having their tapered parts on such slight angles that under any substantial amount of pressure the opening in the pressure vessel might actually be caused to expand sufficiently to permit the plug to pass out through the opening, and in any event, the pressure thus placed by the plug against the soft sealing ring is so great that a very great hoop tension would be created in the metal of the pressure vessel surrounding the opening.

While in theory this type of plug is the cheapest and most easily installed of all, it has never been adopted in practice because in the form proposed it is non-operative under any substantial pressure. The reason is simply that the plug must be small enough to pass through the opening and the taper angle of the plug and opening cannot be made greater than above indicated because the greater the angle, the greater the clearance between the plug and the side wall of the opening, and hence the greater the necessary thickness of the sealing ring. As the thickness of the sealing ring increases its shear strength decreases very rapidly and this is especially true where the temperature is substantially above atmospheric.

In view of the foregoing it is an object of the present invention to provide an improved joint structure for plugs and the like for the closing of pressure vessels, which joint structure will be very simple to make and will be relatively inexpensive as well as highly effective.

Another object of this invention is to provide a structure which will utilize the pressure being retained for the purpose of tightening the parts and forming a tight seal, and for at the same time limiting the action of such sealed pressure so that it will not produce undesirable results in the form of fractures or excessive stresses.

Another object is to provide such a device which will weigh far less than devices for comparable service in the past.

Another object is to provide such a device which will require no complicated casting or machining operations.

Another object is to provide such a device which will be much stronger than similar devices in the past and much more nearly proof against leakage under conditions of high temperature and pressure.

Still another object is to provide such a device which will afford a preformed and predetermined sealing area commensurate with the pressure against which the seal is to be made.

Another object is to provide such a device in which the amount of hoop tension in the material of the pressure vessel surrounding the opening to be sealed may be accurately predetermined and controlled.

Another object is to provide such a device which will utilize the sealed pressure for the purpose of effecting and maintaining a sealing contact between the parts, but in which the amount of hoop tension in the material of the pressure vessel surrounding the opening to be sealed may be accurately predetermined and controlled.

Another object is to provide such a device in which the sealing forces may be accurately predetermined and controlled.

Still another object is to provide such a device in which the hoop tension and the sealing forces may be individually and separately controlled and varied with respect to each other in the designing of the device.

Another object is to provide a joint in which the ratio of unit stresses on the sealing surfaces to the pressure retained by the joint will remain substantially constant during rise and fall of the retained pressure.

Another object of this invention is to provide a structure in which the parts may be easily assembled and disassembled and in which they may then be used over and over again.

Still another object of this invention is to provide a structure which will strengthen the metal of the pressure vessel against hoop tension when the structure of this invention is placed under pressure.

Still another object of this invention is to provide a device of the character referred to in which the sealing ring employed will be prevented from becoming distorted under pressure.

Still another object of this invention is to provide a method for forming a joint or closure of an opening in a pressure vessel.

Other objects and advantages of this invention will become apparent from the following description taken in connection with the accompanying drawings wherein is set forth by way of illustration and example one embodiment thereof.

Figure 7:
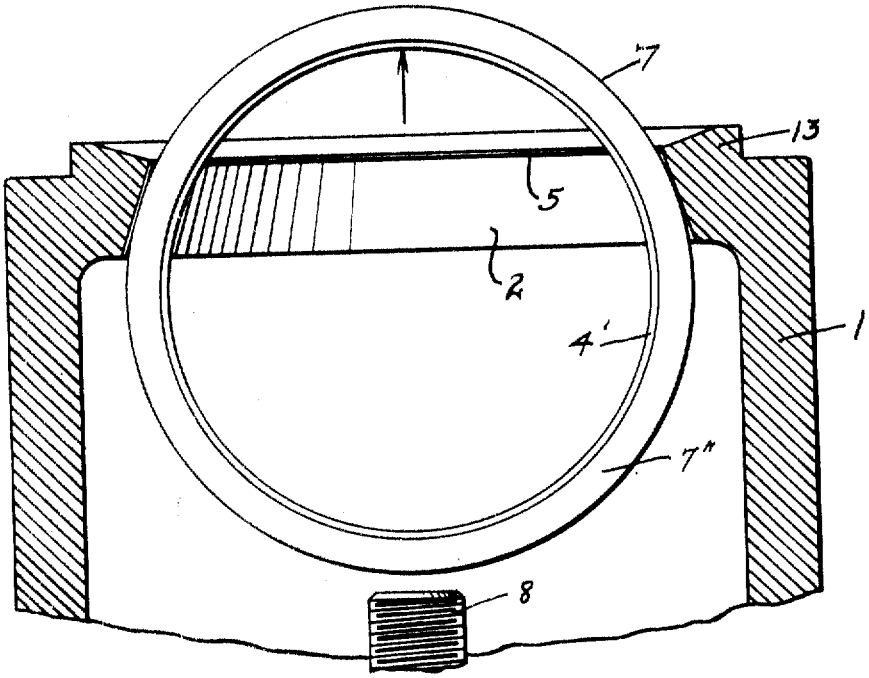
Fig. 7 is a view similar to Fig. 2 but illustrating the manner of removal of a sealing ring which has been set to a circular or substantially circular formation by the action of the plug as illustrated in Figs. 4, 5 and 6.

Referring now more in detail to the drawing, there is illustrated a pressure vessel 1 which may be of any desired size or shape and for any purpose for which pressure vessels may be used. The term "pressure vessel," as employed herein is intended to include any structure of whatever description capable of retaining a substance under pressure. The invention does not relate specifically to the nature or purpose of the vessel but to a means for and method of effecting the closure of an opening in such a vessel.

In accordance with this invention the opening for which this invention provides a closure, is illustrated as being of substantially circular cross section and as tapering or having its sides converging from the inside of the vessel in an outward direction as shown at 2. The closure for this opening is in the form of a plug 3 having its peripheral surface 4 tapered or converging in the same direction as the inner surface 2 of the opening but in this particular instance being tapered on a lesser angle with respect to the axis of the cap or the opening as illustrated for the purpose presently to be set forth. This plug or closure is provided with a transverse outer dimension in at least one plane, which is slightly less than the minimum transverse dimension of the opening at the point 5 so that the plug 3 may be passed inwardly through this opening. It will be seen that the portion of largest outside diameter of the plug 3 is provided by the flange 6 formed integrally with this plug toward the interior of the vessel 1 from the tapered portion 4 on the plug. The purpose of this flange will be presently set forth.

Figure 1:
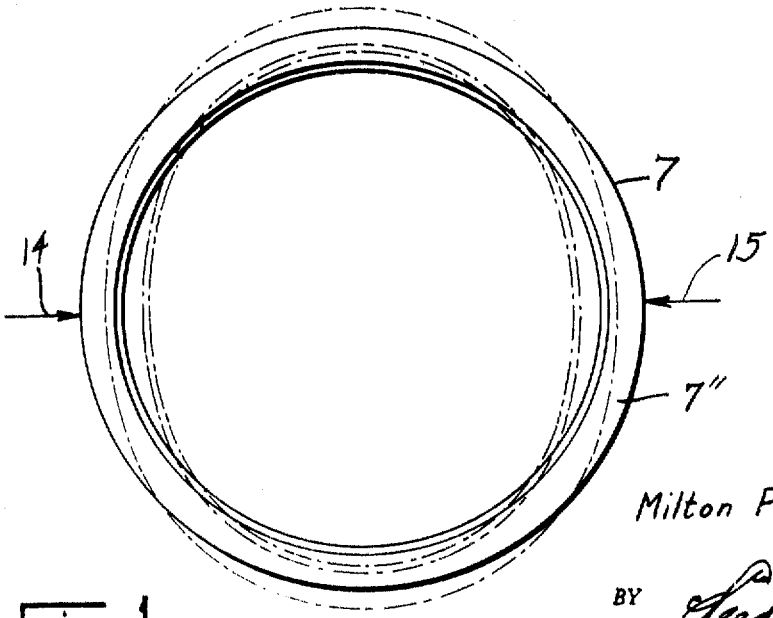
Fig. 1 illustrates a sealing ring adapted to be used in connection with this invention and form a part thereof, and illustrates the manner in which this sealing ring is deflected in placing it within or removing it from an opening.
Figure 5:
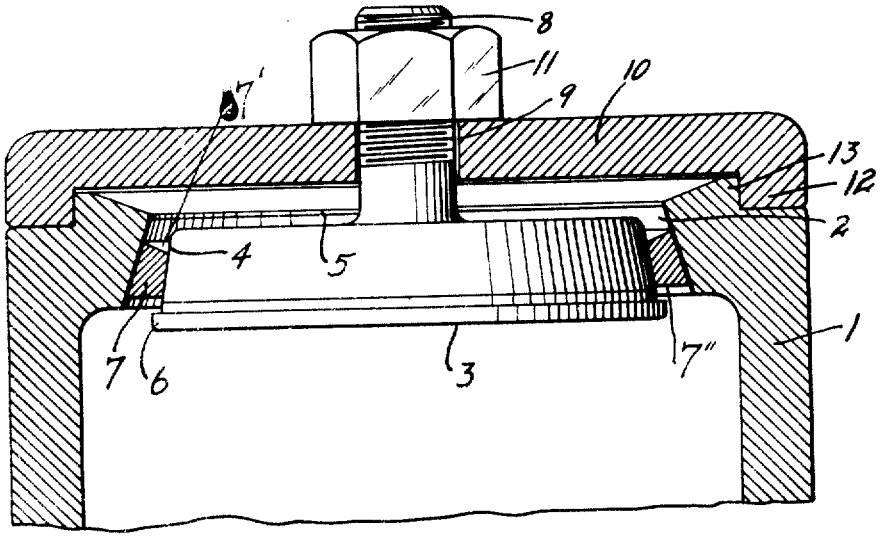
Fig. 5 is a view similar to Fig. 4 but showing the parts after the plug has been pulled outwardly to force the sealing ring into the opening and to force the plug partly into the sealing ring, but before the plug has been forced into the sealing ring far enough to provide a complete seal.
Figure 6:
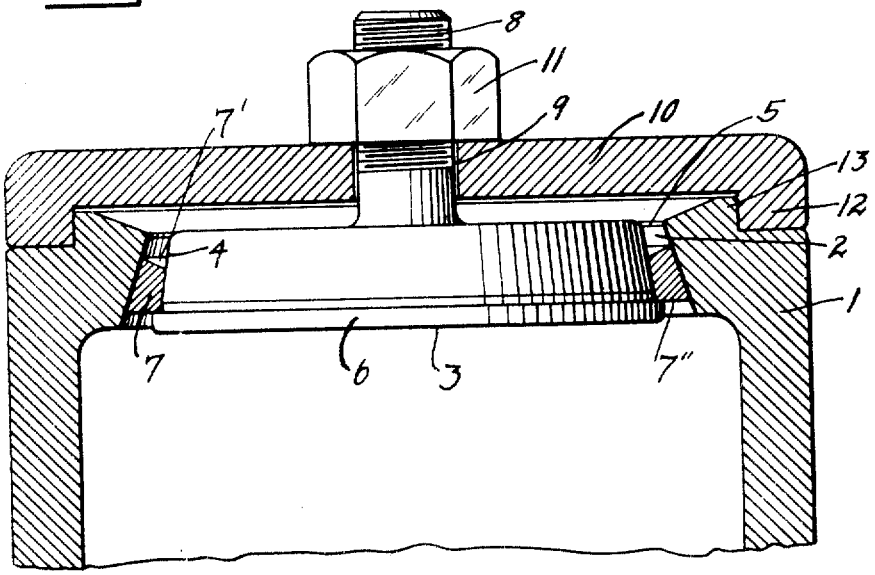
Fig. 6 is a view similar to Fig. 5, but showing the plug after it has been forced into the sealing ring to provide a complete seal between the plug and sealing ring and between the sealing ring and the interior of the opening.

In order to provide a seat for the plug 3 and bridge the space between the tapered surface 4 on the plug and the tapered surface 2 in the opening, thereby preventing the plug from being forced outwardly through the opening, there is provide a sealing ring 7. This ring is initially made circular and is provided with preformed seating surfaces 2′ and 4′ on the outside and inside adapted to seat respectively against the tapered inner surface 2 in the opening and the tapered outer surface 4 on the plug 3. The outer side 2′ and the inner side 4′ are seen as of different inclinations so as to provide the outer end face 7′ and the inner end face 7″. This latter face is of greater width or area than the face 7′ and exposes a greater area to the internal pressure so as to assist in forming and maintaining a seal. In cross section the seal ring is seen in Figs. 5 and 6 as a trapezoid or trapezium. It is formed of a non-plastic material of a strength comparable to the strength of the material of the vessel 1 and the plug 3 but is of such dimensions that it may be deformed or deflected by a sufficient amount to enable it to be inserted through the opening past the portion of smallest diameter 5 of the opening, in the manner illustrated in Figs. 2 and 3. The ring when so deformed is, of course, of elliptical shape as shown in Fig. 1 in dotted lines. It is further to be noted that this ring 7 has its seating surfaces of such diameters that when the ring is moved into the opening and fully seated against the tapered seat within the opening in the pressure vessel, it will lie between the inner and outer extremities of said seat within the opening. Likewise the seating surface on the inside of the ring is formed with such diameters that when the plug is forced into the ring the tapered surface on the plug will seat within the ring with the seating surface on the ring lying intermediate the inner and outer extremities of the tapered surface on the plug and will not be in contact with the flange 6 on the plug when the ring first seats on the plug.

Integrally carried on the plug and extending outwardly therefrom is a threaded stem 8 extending through the aperture 9 in a cap member 10 which is placed over the opening in the pressure vessel. Receiving on the projecting end of the stem 8 is a nut 11.

It is noted that the cap member 10 has an inwardly turned flange 12 along its margin and that this inturned flange engages around the outside of the axially extending projection 13 which surrounds the opening in the pressure vessel.

It will readily be seen that by tightening the nut 11 on the stem 10 the plug 3 will be drawn into place within the opening and a seal will be formed both between the plug and the ring and between the ring and the seat within the opening respectively.

It is contemplated that in some instances where the cross section of the ring is thin in proportion to its diameter, the ring may easily be deflected by hand a sufficient amount to enable it to be inserted through the opening, it being understood that for this purpose the forces would be applied at the points 14 and 15 indicated in Fig. 1. The ring would then spring back into position due to its own resiliency whereupon it could be moved into its seat without necessity for further deflection.

Figure 2:
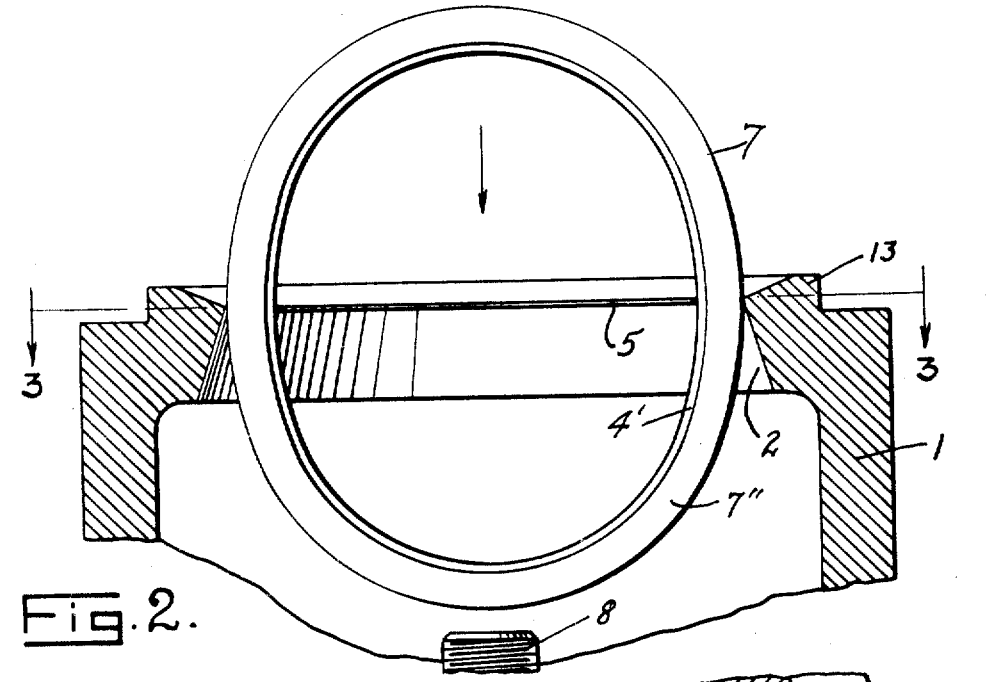
Fig. 2 is a view illustrating a cross section through a portion of a pressure vessel having an opening therein adapted to be closed by this invention, and showing the sealing ring being put in place through the opening.
Figure 3:
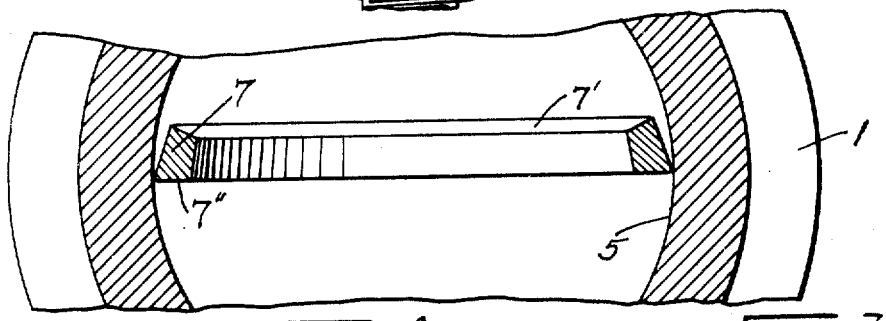
Fig. 3 is a transverse sectional view taken along the line 3—3 of Fig. 2.
Figure 4:
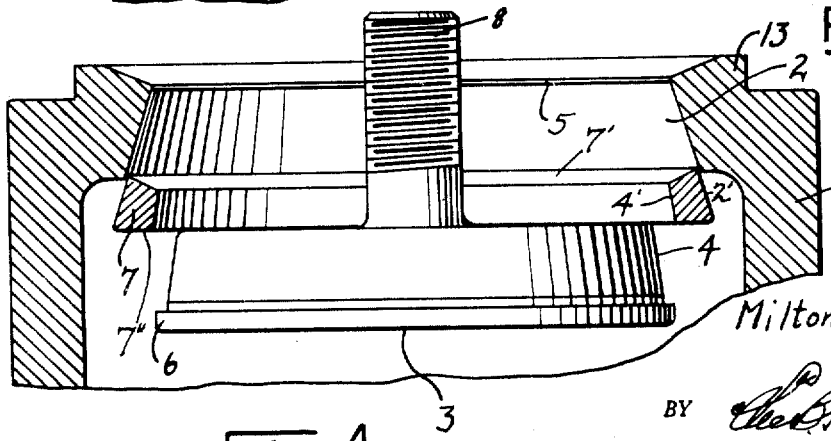
Fig. 4 is a view similar to Fig. 2 but showing the sealing ring after it has been placed within the pressure vessel and showing the closure member or plug after it has been pulled outwardly into contact with the sealing ring and just as it begins to force the sealing ring into the opening.

However, it is also contemplated that in some instances at least the cross section of the ring will be so thick in proportion to its diameter that the ring employed will be of such stiffness as to make it impracticable to deflect it by hand in order to force it into the opening in the pressure vessel. In all cases, the ring is preferably first made circular and then deflected and in those instances in which the thickness of the ring is too great to permit deflecting by hand as above referred to, proper forces may be applied mechanically at the points 14 and 15 to give the ring an elliptical shape so that it may be inserted into position as shown in Fig. 2. Thereupon, after being straightened out and moved into the lower end of the opening, the ring will be forced into its seat by pulling outwardly on the plug member previously inserted into the opening. The initial pulling of the plug member may be accomplished in any practical manner either mechanically or by hand, and the final movement of the plug member into the ring and the seating of the ring will be accomplished by means of the bridge and cap 10 and the nut 11 as illustrated in Figs. 5 and 6. It will be seen that on tightening the nut 11 the ring will first be moved against its seat within the opening in the pressure vessel as shown in Fig. 5 and thus forced to assume its original circular shape. At the same time, the plug will be forced into the ring to the position illustrated in Fig. 5 at which position it will come into full contact with the ring.

In order to fully seat the ring within the opening and the plug within the ring so as to form seals between the surfaces involved, the nut 11 may be still further tightened or pressure fluid may be admitted to the pressure vessel and the pressure thereof increased to fully seat the plug and ring, after which the nut may be taken up by hand. Due to the fact that the angle of the taper within the opening 2 is greater than the angle of the taper on the plug, the plug will move into the ring upon such further tightening of the nut 11 or upon such admission of pressure fluid because of the greater mechanical advantage of the lesser taper rather than for the ring to move further into the tapered opening. As the plug moves into the ring along its relatively small taper, it will wedge the ring tightly between the plug and the tapered wall of the opening to form a seal, but this wedging action by the relatively small taper of the plug will be stopped when the flange 6 comes in contact with the ring. Thereafter any further tendency to move the plug into the opening will cause the plug and ring to move as a single unit, and in the course of this movement this composite member will act as a wedge with the larger angle of taper on which the wall of the opening is formed.

The reason for the construction above described is that it be essential that the lateral or radial component of the force on the plug and within the vessel be exerted in a radial direction by the plug to cause the plug to form a seal with the ring and the ring to form a seal with the inside of the opening in the pressure vessel, but it is undesirable that this force be allowed to continue to increase as pressure within the vessel builds up because as this force increases, there is built up a very large hoop tension in the metal of the vessel surrounding the opening, and this tension if allowed to increase indefinitely as the pressure within the vessel increases would either rupture the vessel or necessitate a design of vessel with much larger wall sections about the opening. Therefore, when sufficient force has been exerted by the plug with the relatively slight taper, the action of the relatively slight taper is stopped by the flange 6 coming into contact with the ring, and thereupon any further pressure upon the plug will be taken by the relatively larger taper within the opening, and it will readily be seen that the mechanical advantage and the wedging action due to this relatively larger taper will be very less than on the smaller taper and that the increased hoop tension created thereby will be correspondingly less.

In order to still further provide for relieving of any excessive hoop tension in the metal of the pressure vessel about the opening, the cap 10 engaging snugly about the outstanding flange 13 surrounding the opening will add greatly to the strength of the vessel about the opening and serve to reinforce the metal of the pressure vessel to relieve it of excessive hoop tension that is developed.

It is further to be noted that the angles of the tapers both within the opening and on the plug are sufficiently large so as to prevent either the plug within the ring or the ring within the opening from acting as a sticking wedge. Such angles are relatively well known and in the case of steel it is known that if the included angle between the opposite sides of a wedge is less than 18 degrees the wedge will probably stick but that if such an angle is equal to or greater than 18 degrees there will be no sticking and the wedge may easily be removed. Inasmuch as it is one of the objects of this invention to provide a closure which may be easily removed when necessary and in which the parts will not be damaged and hence may be reused, the angles involved are made of such size as to provide a non-sticking wedge.

In the event that the ring is not made of sufficiently resilient or elastic material to permit its temporary distortion, it will first be given a set such as above described by stressing it beyond its elastic limit by forces applied at 14 and 15, so that it may be passed through the opening into the pressure vessel in the manner indicated in Fig. 2. The ring will then be reshaped by the plug to a circular shape to form the closure, but having an elastic limit sufficiently high so that in being forced back into circular shape, it will not be forced past its elastic limit, it will when released by loosening the nut 11 slip out of the opening and off of the plug and again resume its elliptical shape. Thereupon it may be readily removed from the pressure vessel in the same manner in which it was inserted. However, if the ring be of a material which is not so elastic or resilient it will when forced into its seat by the plug be forced to resume its original circular shape and will take a set and for that reason will not fully recover its previous elliptical shape when released by the loosening of the nut 11. In the case of the present invention, the ring is provided as illustrated with a maximum outer diameter which is sufficiently small so that it may enter the lower or inner portion of the opening in the pressure vessel, even when the ring is in circular shape. Then when a pull is exerted upon the ring from outside the vessel, the opposite sides of the opening in the pressure vessel will act as inclined planes to apply forces substantially at the points 14 and 15 and thus to compress the ring a sufficient amount to enable it to be removed from the vessel. If this ring were of larger outside diameter so that it would not enter the opening as indicated then it would abut the relatively sharp edges at the inner end of the opening and one attempting to remove the ring would not have the mechanical advantage of the inclined plane action afforded by the side walls of the opening in compressing the ring.

It is thought that the operation of this device will be clear from the foregoing description but the manner of operation of the device in closing and opening a pressure vessel may be briefly described as follows:

The ring will first be either forced manually into an elliptical shape or given a permanent set into such shape by mechanical means as illustrated in Fig. 1. The plug member 3 will then be passed into the interior of the pressure vessel through the opening 2 whereupon the ring now deflected will be put in place likewise through the opening. The ring will then be allowed to rest upon the plug and if the ring has been distorted manually and possesses sufficient elasticity to resume its circular shape it will pass down over the plug and may be pulled up with the plug into the interior of the opening of the pressure vessel as shown in Fig. 5. However, if the ring has been given a permanent set in the manner above described it will probably not pass down over the plug but will rest on the outer end of the plug. The outside portion of the ring, however, will be small enough to just begin to enter the opening in the pressure vessel and an outside pull on the plug will force it into such opening and thereby force it to resume its original circular shape. As it approaches its original circular shape, the opening through the ring will become large enough to allow the ring to fit down over the plug, whereupon the plug will enter the ring and the parts will move to the positions shown in Fig. 5. The cap 10 will then be put in place as illustrated and the nut 11 put on the stem 8 and tightened down. This may be done before the ring is fully forced back to its circular position and the nut 11 may be employed to assist in thus forcing the ring to resume its circular shape.

The tightening of the nut 11 will be continued until the plug 3 is forced into the ring a sufficient amount to cause the flange 6 to contact the ring. By this time a sufficient force will have been exerted upon the ring between the plug and the interior of the opening to cause the ring to form a seal with both of those members.

Now, if pressure be admitted to the vessel the pressure will act upon the plug and ring as a unit and will tend to force this unit which is now self-sealing, out through the opening. This unit, however, will act as a wedge with a relatively large included angle and the force exerted upon the unit will thus be transmitted to the material of the pressure vessel surrounding the opening. The pressure within the vessel will be raised to substantially the pressure at which it is intended for the vessel to operate, thus forcing the plug and ring to seat to the exact extent necessary to carry the operating pressure. In determining the operating pressure no account is taken of possible surges in pressure even though these surges which might be anticipated should be considerably above the normal operating pressure. With the normal operating pressure existing within the vessel the nut 11 will be screwed up in any convenient manner until it engages the cap 10 so that it will hold the plug and ring substantially in the position which they assumed on the application of the operating pressure. Thereupon, if desired the pressure within the vessel may be increased to any testing pressure which may be indicated by the use to which the pressure vessel will be put. This testing pressure, being higher than the operating pressure will, of course, drive the plug tighter, but when released, the plug will loosen until stopped by the nut 11 in the position which it should occupy for the purpose of holding the normal operating pressure. The cap 10 will, as above stated, serve to take up and reinforce the surrounding portions of the pressure vessel against the hoop tension therein caused by the action of the closure as a wedge within the opening.

It is to be noted at this point that because the maximum diameter of the ring in its circular shape is slightly less than the maximum diameter of the opening, and because the axial extent of the ring is less than the axial extent of the seat for the ring within the opening, the entire outer surface of the ring will engage the seat. This construction makes it possible to accurately predetermine the amount of seating surface between the ring and the interior of the opening and thus to design the ring to hold the pressure to which it is to be subjected. Likewise, the inside seating surface of the ring is made of less extent than the seating surface on the plug so that regardless of the pressure exerted upon the plug the tapered area in contact between the ring and the plug as well as the tapered area in contact between the ring and the inner wall of the opening will always be the same and may be accurately predetermined in accordance with the pressures to be encountered. When it is desired to remove the closure, the nut 11 is loosened and inasmuch as the angles of the tapered opening and the taper on the plug will be greater than the angle of a sticking wedge for the material employed, the ring may be easily removed from the opening and the plug from the ring. After the cap 10 has been removed the plug is dropped back into the interior of the pressure vessel and the ring is turned sideways to remove it from the opening in the same manner in which it was inserted. If the ring is of sufficiently resilient or elastic material and has been given a preliminary set so that it might be inserted into the opening, it will when released from the opening and the plug resume such elliptical shape so that it may be readily removed from the opening. If, however, it is of a material not so elastic, it will retain its substantially circular shape upon being released from the opening and from the plug. In this case, however, it will be seen that the ring may be moved without deflection until its outermost portions engage the tapered inner surfaces of the opening. An outward pull on the ring will then cause these opposite portions of the ring to ride up into the tapered opening and the opposite sides of the opening will thus act as inclined planes to compress the ring sufficiently so that it may pass through the opening.

After the ring has been removed the plug may be readily withdrawn.

It will be noted that in the construction herein described, the plug will not only be seated with a tightness proportional to the sealed pressure as that pressure is increased, but, due to the fact that the taper angles employed in the opening and on the plug are great enough so that they are non-sticking angles, the plug and ring will also loosen upon their seats as the pressure within the vessel is lowered, so that the parts will not be subjected at any time to stresses greater than necessary for the purpose of holding the pressure to which they are subjected. This is an important feature of this invention because with structures heretofore known it has been necessary to place upon the sealing parts stresses sufficient to retain the maximum pressures, i. e. the test pressures, to which the vessel would be subjected. Such stresses are naturally much greater than would be necessary to retain the normal operating pressure within the vessel and under such greatly increased stresses it not infrequently occurs that the materials forming the various parts will eventually yield so as to destroy or impair the effectiveness of the joint. With the present invention, on the other hand, the sealing parts are stressed only sufficiently to seal against the normal operating pressures within the vessel, and under such reduced stresses are much less apt to yield over a long period of time. In the event of surges of pressure within the vessel, the plug and ring will automatically tighten to seal against such higher pressures, but immediately upon the pressure within the vessel falling again to normal operating pressure, the plug and ring will move back until the stresses on the sealing parts are again only sufficient to seal against the normal operating pressure. It will, therefore, be seen that with this construction the stresses upon the various parts will at all times vary substantially constant ratio to the pressure being retained by the joint and that this will be true not only during the rise but also during the fall of pressure within the vessel.

It has been found with this structure that a great deal of the weight of materials required may be eliminated as compared with other structures for similar purposes. It is also apparent that inasmuch as all parts are formed with circular cross section they may be readily machined to accurate fits, thus reducing the cost of manufacture as well as the cost of materials involved and eliminating much loss due to wastage in manufacturing.

It will further be seen that the closure structure described is very simple to operate and that it may be used again and again without destruction or damage to the parts.

Furthermore, it will be apparent that the greater the pressures that are to be encountered the more tightly will the closure be seated and the better it will perform its function and it will not be substantially effected by changes in temperature. Adequate means has been provided for reinforcing those parts of the pressure vessel which would be stressed by pressure within this structure, and the arrangement provides a structure in which sealing pressures may be readily attained but in which once those pressures are attained, additional forces which might cause excessive stresses in the walls of the pressure vessels will be prevented.

Thus means has been provided for adequately and completely accomplishing all of the objects sought by this invention.

Having described my invention I claim:

1. In combination with a pressure vessel having an outwardly converging tapered substantially circular opening therein, a substantially circular closure for said opening having its outer edge of a lesser taper but in the same direction as said opening and its maximum diameter less than the minimum diameter of said opening, and a resilient non-compressible metal sealing ring having its outer and inner surfaces tapered to the same tapers as said opening and closure respectively, said ring being distortable to enable it to be inserted through said opening.

2. In combination with a pressure vessel having an outwardly converging tapered substantially circular opening therein, a substantially circular closure for said opening having its outer edge of a lesser taper but in the same direction as said opening and its maximum diameter less than the minimum diameter of said opening, and a resilient non-compressible metal sealing ring having its outer and inner surfaces tapered to the same tapers as said opening and closure respectively, said ring being distortable to enable it to be inserted through said opening and the tapered surfaces on said ring being of less axial extent than the seat provided by said tapered opening and the tapered surface on said closure respectively.

3. In combination with a pressure vessel having an outwardly converging tapered substantially circular opening therein, a substantially circular closure for said opening having its outer edge of a lesser taper but in the same direction as said opening and its maximum diameter less than the minimum diameter of said opening, and a sealing ring having its outer and inner surfaces tapered to fit said opening and closure tapers respectively, said ring being sufficiently resilient to enable it to be compressed diametrically and inserted through said opening, and the tapered surfaces on said ring being of less axial extent than the seat provided by said tapered opening and the tapered surface on said closure respectively and of diameters adapted to seat in said opening and on said closure intermediate the ends of the tapered surfaces therein and thereon respectively.

4. In combination with a pressure vessel having an outwardly converging tapered substantially circular opening therein, a substantially circular closure for said opening having its outer edge of a lesser taper but in the same direction as said opening and its maximum diameter less than the minimum diameter of said opening, and a resilient sealing ring of non-compressible metal having its outer and inner surfaces tapered to fit said tapered opening and closure respectively, said ring being distortable diametrically to enable it to be inserted through said opening when the maximum outside diameter of said ring in circular shape is less than the maximum diameter and greater than the minimum diameter of said opening.

5. In combination with a pressure vessel having a tapered substantially circular opening therein, a substantially circular member adapted to be positioned within said opening and having a tapered peripheral surface of a lesser taper toward the outside of the vessel than the taper of the opening in said vessel and having a maximum outer diameter such that it will pass into said opening, a sealing ring having its outer and inner peripheries pre-formed to fit said tapered opening and circular member respectively, and an external shoulder on said circular member to abut said ring for limiting the extent to which said member may be forced into said ring.

6. In combination with a pressure vessel having a tapered substantially circular opening therein, a substantially circular member adapted to be positioned within said opening, said member having a tapered peripheral surface of lesser taper toward the outside of the vessel than the taper of the opening in said vessel, the maximum outer diameter of said member being such that it will pass into said opening, and a sealing ring having its outer and inner peripheries pre-formed to fit said tapered opening and circular member surface respectively, and an external shoulder on said circular member for limiting the extent to which said member may be forced into said ring.

7. In combination with a pressure vessel having a tapered substantially circular opening therein, a substantially circular member adapted to be positioned within said opening having a tapered peripheral surface of lesser taper toward the outside of the vessel than the taper of the opening in said vessel and having a maximum outer diameter such that it will pass into said opening, the angle of the taper in said opening being greater than that of the taper on said member, and a sealing ring having its outer and inner surfaces pre-formed to fit said tapered opening and circular member respectively, and an external shoulder on said circular member disposed inwardly of said tapers for limiting the extent to which said members may be forced into said ring.

8. In combination with a pressure vessel having a tapered substantially circular opening therein, a substantially circular member adapted to be positioned within said opening having a tapered peripheral surface of lesser taper toward the outside of the vessel than the taper of the opening in said vessel on an angle less than the angle of the taper in said opening, and having a maximum outer diameter such that it will pass into said opening, and a sealing ring having its outer and inner surfaces pre-formed to fit said tapered opening and circular member respectively, and an external shoulder on said circular member disposed adjacent the inner end for limiting the extent to which said member may be forced into said ring.

9. In combination with a pressure vessel having a tapered substantially circular opening therein, a substantially circular member adapted to be positioned within said opening having a tapered peripheral surface of a lesser taper toward the outside of the vessel than that of the opening of said vessel and having minimum outer diameter such that it will pass into said opening, a sealing ring having its outer and inner surfaces pre-formed to fit said tapered opening and circular member respectively, and means for limiting the extent to which said member may be forced into said ring.

10. In combination with a pressure vessel having a substantially circular tapered opening therein and axially projecting portion about said opening, a substantially circular member adapted to be positioned within said opening and having an outer periphery of a lesser taper toward the outside of the vessel than that of the opening of said vessel, a tapered seal ring having outer and inner tapered surfaces to fit said vessel opening and surface of said member respectively to provide a seal, a circular bridging member removably engaging about said axially projecting portion and extension over said opening for reinforcing said pressure vessel against hoop tension caused by said tapered substantially circular member being forced into said ring and the ring into said opening, and take up means connecting said substantially circular member and said bridging member for drawing said substantially circular member outwardly when said member is seated in said opening.

11. In combination with a pressure vessel having a substantially circular tapered opening therein and axially projecting portion about said opening, a substantially circular member adapted to be positioned within said opening and having an outer periphery of a lesser taper toward the outside than the taper of the opening of said vessel, a tapered seal ring having outer and inner tapered surfaces to fit said vessel opening and surface of said member respectively to provide a seal, a circular bridging member removably engaging about said axially projecting portions and extending over said opening for reinforcing said pressure vessel against hoop tension caused by said tapered substantially circular ring and member being forced into said opening, and means for drawing said substantially circular member outwardly to seat in said ring.

12. In combination with a pressure vessel having a substantially circular tapered opening therein and a substantially circular axially extending shoulder on said vessel about said opening outwardly of said opening, a substantially circular member adapted to be positioned within said opening and having an outer periphery of a lesser taper toward the outside than the taper of said vessel opening, a seal ring fitting in the opening and on said member, a circular bridging member having a part removably engaging about said shoulder and extending over said opening, and take up means connecting said circular member and said bridging member for drawing said circular member outwardly to seal said ring.

13. A closure for an opening having an inwardly flared edge comprising a cover of the same shape as said opening with its edge tapered in the same direction but of a lesser taper than the edge of said opening and being smaller than said opening, a rigid ring adapted to fit between said edges and having pre-formed peripheral faces adapted to mate respectively with the edges of the opening and cover, said ring being larger than the opening but having sufficient spring to enable its being passed through said opening and means for drawing the parts together to wedge said ring in sealing relation.

14. In combination with a steel pressure vessel having a substantially circular opening defined by an edge tapered toward the outside and machined to form a seat, a substantially circular steel closure for the opening capable of being passed through said opening and having a machined edge of a lesser taper but in the same direction as said seat, and a ring of springlike material adaptable to fit between said closure edge and said seat and having machined surfaces to fit the surfaces of said closure edge and seat respectively, said ring being sufficiently resilient to permit its passage through said opening and to thereafter seat on said surfaces so that internal pressure affects movement of said closure to wedge said ring against the vessel edge to provide a seal.

15. A closure assembly for pressure containers having an opening, the wall defining such opening being an outwardly tapering surface, a closure plug having an outwardly converging tapered peripheral surface of a lesser taper than the taper of said wall, the maximum diameter of said plug being less than the minimum diameter of the opening so that the plug may be inserted therethrough, said wall surface and plug periphery being spaced apart when the plug is in operative position to provide a space therebetween, a sealing ring of a resilient non-compressible material having inner and outer peripheral tapering surfaces correspondng to the adjacent plug and wall surfaces respectively and filling such space, and means for manually drawing said plug outwardly to force said seal ring against the opening wall.

16. A closure assembly for pressure containers having an opening, the wall defining such opening being an outwardly tapering surface, a closure plug having an outwardly converging tapered peripheral surface of a lesser taper than the taper of said wall, the maximum diameter of said plug being less than the minimum diameter of the opening so that the plug may be inserted therethrough, said wall surface and plug periphery being spaced apart when the plug is in operative position to provide a space therebetween, a sealing ring of a resilient non-compressible material having inner and outer peripheral tapering surfaces corresponding to the adjacent plug and wall surfaces respectively and filling such space, means for manually drawing said plug outwardly to force said seal ring against the opening wall, and means on said plug to abut the ring due to pressure on the plug so that the load on the plug and ring is transmitted to the tapered wall surface of the container so as to maintain a seal.

17. A closure assembly for pressure containers having an opening, the wall defining such opening being an outwardly tapering surface, a closure plug having an outwardly converging tapered peripheral surface of a lesser taper than the taper of said wall, the maximum diameter of said plug being less than the minimum diameter of the opening so that the plug may be inserted therethrough, said wall surface and plug periphery being spaced apart when the plug is in operative position to provide a space therebetween, a sealing ring of a resilient non-compressible material having inner and outer peripheral tapering surfaces corresponding to the adjacent plug and wall surfaces respectively and filling such space, means for manually drawing said plug outwardly to force said seal ring against the opening wall, and means on said plug to abut the ring due to pressure on the plug so that the load on the plug and ring is transmitted to the tapered wall surface of the container so as to maintain a seal, said first means comprising a cap closure embracing the container to confine the container.

*18. The combination of a pressure vessel having an outwardly contracting substantially conical opening therethrough; a substantially conical closure member smaller than, and adapted to be positioned within said opening and having a peripheral surface of less taper toward the outside of the vessel than the taper of the opening; a sealing ring of elastic metal having its outer and inner surfaces preformed to fit said conical opening and said conical closure member respectively when the closure is positioned within the opening and the ring is interposed between them and is substantially unstressed; and stop means adapted to react between said closure member and said ring and positioned to permit the closure member when forced outward, to move relatively to the ring and subject the ring to hoop tension, but to limit the extent of such relative motion.*

*19. In combination: a pressure vessel and a sealing closure therefor, said vessel having a tapered substantially circular opening therein; a substantially conical member dimensioned to be positioned within said opening and having a tapered peripheral surface of lesser taper toward*

*the outside of the vessel than that of the opening in said vessel, so that the interval between said member and said vessel narrows outwardly of the vessel opening, and said member having a maximum outer diameter to pass through said opening; an annular sealing ring of elastic metal having its outer and inner peripheries preformed to fit the interval between said member and vessel opening; and external shoulder means on said member adjacent the inner larger end thereof to abut said ring for limiting the extent to which said member may be forced into said ring; the mean unstressed internal diameter of said ring bearing such relation to the mean diameter of the tapered surface of said member, that forced entry of said member into said ring stretches the ring to cause said shoulder to abut said ring and effect a seal between the ring and the member, whereby in subsequent vessel sealing movements, the member and ring move together as a unit with respect to the vessel opening, and the ring, in contact with the wall of the vessel opening, stresses the metal surrounding the vessel opening in hoop*

*tension to thereby correspondingly reduce the tension in the ring and effect a complete seal of the vessel opening.*

MILTON P. LAURENT.

References Cited in the file of this patent or the original patent

UNITED STATES PATENTS

| Number | Name | Date |
|---|---|---|
| 248,784 | Page | Oct. 25, 1881 |
| 303,615 | Bride | Aug. 19, 1884 |
| 332,793 | Dickson | Dec. 22, 1885 |
| 724,939 | Reis | Apr. 7, 1903 |
| 849,837 | Eggleston | Apr. 9, 1907 |
| 897,460 | Greenlaw | Sept. 1, 1908 |
| 1,502,038 | Key | July 22, 1924 |
| 1,967,703 | Bullington | July 24, 1934 |
| 2,258,804 | Pfleumer | Oct. 14, 1941 |

FOREIGN PATENTS

| Number | Country | Date |
|---|---|---|
| 3,143 | Great Britain | Feb. 20, 1891 |
| 18,069 | Great Britain | Aug. 3, 1897 |